(12) United States Patent
Liu

(10) Patent No.: US 11,353,376 B2
(45) Date of Patent: Jun. 7, 2022

(54) METHOD AND SYSTEM FOR DETECTING FASTENING STATE OF FASTENING STRUCTURE

(71) Applicant: Zhejiang Future Technology Institute (jiaxing), Jiaxing (CN)

(72) Inventor: Shuangwen Liu, Jiaxing (CN)

(*) Notice: Subject to any disclaimer, the term of this patent is extended or adjusted under 35 U.S.C. 154(b) by 498 days.

(21) Appl. No.: 16/363,739

(22) Filed: Mar. 25, 2019

(65) Prior Publication Data

US 2020/0309640 A1 Oct. 1, 2020

(51) Int. Cl.
*G01M 13/00* (2019.01)
*G01H 11/06* (2006.01)
*G01H 1/12* (2006.01)

(52) U.S. Cl.
CPC .......... *G01M 13/00* (2013.01); *G01H 1/12* (2013.01); *G01H 11/06* (2013.01)

(58) Field of Classification Search
CPC ........ G01M 13/00; G01M 7/00; G01H 11/06; G01H 1/12; G01L 5/246
See application file for complete search history.

(56) References Cited

U.S. PATENT DOCUMENTS

| | | | | |
|---|---|---|---|---|
| 5,967,269 | A * | 10/1999 | Kato | F16F 15/03 188/380 |
| 2009/0276168 | A1 * | 11/2009 | Liu | G01H 1/00 702/56 |
| 2016/0001781 | A1 * | 1/2016 | Fung | B60K 28/02 701/36 |
| 2016/0320347 | A1 * | 11/2016 | Moakier | G01M 13/00 |

FOREIGN PATENT DOCUMENTS

| | | | | |
|---|---|---|---|---|
| CN | 107153002 | * | 10/2017 | ............ G01M 13/00 |
| CN | 108548516 | * | 6/2018 | ............ Y02E 10/20 |

OTHER PUBLICATIONS

Seyed Majid Yadavar Nikravesh et al., "A Review Paper on Looseness Detection Methods in Bolted Structures", Latin American Journal of Solids and Structures 14 (2017), pp. 2153-2176.*
K. He eta al., "Detecting Loosening of Bolted Connections in a Pipeline Using Changes in Natural Frequencies", Proceedings of the ASME 2011 International Design Engineering Technical Conferences & Computers and Information in Engineering Conference, IDETC/CIE 2011, Aug. 28-31, 2011, Washington, DC, USA.*

* cited by examiner

*Primary Examiner* — Alexander Satanovsky
(74) *Attorney, Agent, or Firm* — Jigang Jin

(57) ABSTRACT

The present invention discloses a method and system for detecting the fastening state of a fastening structure which fixes structural elements. At least a first vibration sensor is mounted on a first structural element for collecting vibration data of the first structural element. At least a second vibration sensor is mounted on a second structural element or on the fastening structure for collecting vibration data of the second structural element or the fastening structure. The fastening state of the fastening structure is determined using the vibration data collected. The method and system enable detection of the fastening state of a fastening structure with low-power consumption and low cost.

13 Claims, 1 Drawing Sheet

METHOD AND SYSTEM FOR DETECTING FASTENING STATE OF FASTENING STRUCTURE

FIELD OF INVENTION

This invention generally relates to detecting fastening state of a fastening structure and specifically to detecting fastening state of a fastening structure which fixes multiple elements.

BACKGROUND OF THE INVENTION

Structural elements may be fastened together by bolting, welding, bonding, or other suitable methods. Fastening methods are used to strengthen a structure or for transmission purpose. In some applications, stability issues of a structure constructed by fastened structural elements may cause property damage or even fatal accidents. Therefore, detection of the fastening state in regard to structures formed by fastened structural elements is not only important but also indispensable in certain scenarios.

For instance, transmission towers, which support power lines, are constructed using specialty bolts. When some of the bolts become loosened over time, a transmission tower may vibrate more severely in high winds. The intensified vibration, in turn, may loosen the bolts further. Hence, it is needed to find and tighten any loosened bolts in time to lower the risk of potential structural damage or even collapse of the transmission tower. Currently, the fastening state of a bolt is checked by inspectors in person periodically. However, such a manual method has low efficiency and safety issues may not be identified in time.

Utilizing sensors and an electronic system, the fastening state of a bolt may be monitored efficiently, autonomously, and before an accident happens. But the current techniques are complicated to implement, because the systems are not low-cost and require historical data in detection. For example, the Chinese patent application with publication No. CN108414075A discloses a method to inspect the looseness of a fastening bolt for a high voltage breaker. First, signals from a vibration acceleration sensor are converted to the frequency domain. Then, the inherent frequency in the acceleration frequency domain is calculated. For detection, a model database is needed to cover the state of non-looseness. As another example, the Chinese patent application with publication No. CN107976307A discloses an online detection device for monitoring a bolt installed on a transmission tower. The device detects looseness of the bolt. It calculates the energy of the acceleration frequency band, after signals from a vibration acceleration sensor are converted to the frequency domain. Again, a model database for the state of non-looseness is created.

Signal conversion from time domain to frequency domain takes considerable amount of system resources. In addition, in certain applications such as in the field of Internet of Things, it is difficult to supply power even by battery. Moreover, it is hard to apply it to applications which require a great deal of detection points because of high cost. In another aspect, although it is possible in theory to build a database for vibration signals in non-looseness state, it takes a long time to accumulate the historical data. Furthermore, different external excitation states, such as excitation state caused by different wind speeds and wind directions, are needed for data collection. Additionally, vibration frequency of a structural element may change and the changing process is complicated. Thus it is difficult to build a database which has complete data sets.

In addition, the Chinese patent application with publication No. CN107024343A discloses a looseness testing system for a fixed bolt. The method uses a GIS disc insulator and analyzes propagation modes of vibration via differences between two time-domain vibration signals from the same structure. But it is about propagation of vibration in the same structure and can't be used to analyze the fastening relationship between two structural elements.

SUMMARY OF THE INVENTION

The present invention discloses a method and system for detecting the fastening state of a fastening structure which fixes structural elements. The detection method and system employ vibration sensors to collect vibration data. The vibration sensors have low-power consumption, small size, and low cost. The vibration data is used to determine the fastening state of the fastening structure. The method may reduce the calculation load and lower the system cost while ensuring fast and steady detection of the fastening state of a fastening structure.

For aforesaid objectives, a method and a system are provided respectively as follows.

The method is designed to detect the fastening state of a fastening structure which fixes structural elements. The method includes:

Collecting vibration data of a first structural element via at least one vibration sensor mounted on the first structural element;

Collecting vibration data of a second structural element or the fastening structure via at least one second vibration sensor mounted on the second structural element or the fastening structure; and Determining the fastening state of the fastening structure using the vibration data collected.

Similarly, the system is also designed to detect the fastening state of a fastening structure which fixes structural elements. The system includes:

At least one first vibration sensor mounted on a first structural element for collecting vibration data of the first structural element;

At least one second vibration sensor mounted on a second structural element or the structural structure for collecting vibration data of the second structural element or the fastening structure; and A processing module for determining the fastening state of the fastening structure using the vibration data collected.

The method and system have advantages of easy implementation, low cost, and low-power consumption for the calculation process. The method and system are especially suitable for applications of low-power demand, places where external power supply is unavailable, and places where batteries supply power.

Preferably, aforementioned fastening structures include, but are not limited to, a fastening component and a fixing structure formed by welding, absorbing, or bonding. The fastening components include, but are not limited to, a bolt, a stud, a screw, a nut, a tapping screw, a wood screw, a washier, a collar, a pin, a rivet, an assembly with jointing components, a welding stud, and the like.

Preferably, the vibration sensor includes, but is not limited to, at least a vibration acceleration sensor, a vibration velocity sensor, or a vibration displacement sensor.

Preferably, the vibration data includes, is but not limited to, at least data of vibration acceleration, data of vibration velocity, or data of vibration displacement.

Preferably, the vibration sensor is of a vibration sensor which has one axis, two axes, or more than two axes.

Preferably, determining the fastening state of a fastening structure using the vibration data includes the following steps:

Setting at least one looseness index threshold of the fastening state, calculating the looseness index of the fastening state using the vibration data, comparing the calculated looseness index with the looseness index threshold, and determining the fastening state of the fastening structure.

Preferably, the method for setting the looseness index threshold includes: arranging different fastening states with respective fastening degree for a fastening structure, calculating the looseness index of the fastening structure respectively using vibration data collected, obtaining the relationship between the fastening degree and the looseness index, and determining the looseness index threshold.

Preferably, a fastening component has threads. The screwed-out angle and/or screwed-out turns of the fastening component are calculated using vibration data collected by the vibration sensors with two axes or more than two axes. At least one screwed-out angle threshold and/or at least one screwed-out turn threshold of the fastening state is set according to the screwed-out angle and/or the screwed-out turns of the fastening component. Then the fastening state of the fastening component is determined by comparing the screwed-out angle and/or the screwed-out turns with the screwed-out angle threshold and/or the screwed-out turn threshold.

In operation, a detection system of the present invention may be disconnected to certain systems in offline state or connected to certain systems in online state.

For a system in offline state, its vibration sensors collect vibration data respectively when needed. The processing module determines the fastening state of a fastening structure using the vibration data.

For a system in online state, its vibration sensors respectively collect vibration data continuously, by schedule, or according to certain setup. The processing module determines the fastening state of a fastening structure using the vibration data.

Preferably, the processing module sends out alarm signals when certain fastening state of the fastening structure is determined.

In the present invention, the processing module may be mounted close to a fastening structure to be detected. Alternatively, the processing module, when connected via wired or wireless networks, may also be placed at a remote location away from the fastening structure.

The present invention provides a monitoring system for detecting the fastening state of a fastening structure. The system has the following merits:

As the system uses low-power, small-size, and low-cost vibration sensors, it reduces the cost and power consumption of the system. The calculation method of the looseness index is simple and consumes less energy in a detection process compared to that of prior arts. In addition, values of looseness index enable fast and steady detection of the fastening state of a fastening structure. Moreover, multilevel looseness index thresholds may be set in accordance with specific experiments, and multilevel alarm signals about the fastening state of the fastening structure may be arranged through multiple ways. Therefore, comprehensive detection of the fastening state of a fastening structure may be conducted in time and at low cost.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION

Detailed description of the present invention is provided below along with figures and embodiments, which further clarifies the objectives, technical solutions, and advantages of the present invention. It is noted that schematic embodiments discussed herein are merely for illustrating the invention. The present invention is not limited to the embodiments disclosed.

Embodiment 1

Figure 1:
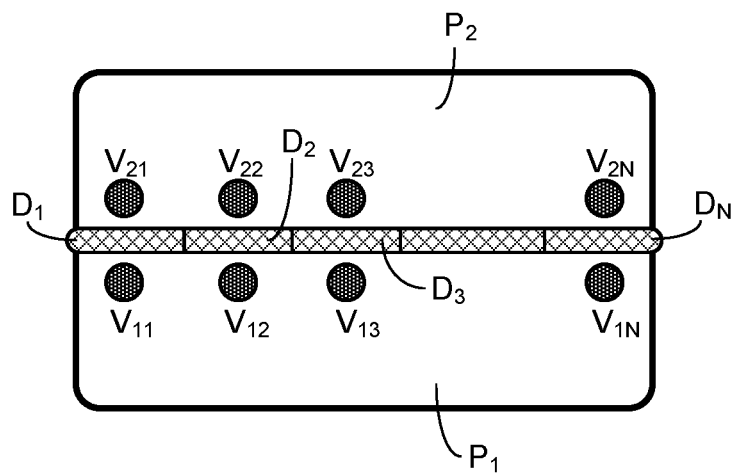
FIG. 1 shows an exemplary structure to illustrate a method and system for detecting the fastening state of a fastening structure which fixes multiple structural elements as described in embodiment 1.

Embodiment 1 illustrates a method and system for detecting a fastening structure formed by welding. In the embodiment, acceleration sensors are optionally used as the vibration sensor. As shown in FIG. 1, a first structural element $P_1$ and a second structural element $P_2$ are fastened by welding. A welding seam between the two elements is divided into multiple seam segments for detention purpose. The welding seam segments may be marked as $D_1, D_2, \ldots, D_n$.

Take the first seam segment $D_1$ for example. Assume the fastening state of segment $D_1$ is being monitored. The first structural element $P_1$ carries the main vibration source, where an electric motor may be installed. Fix a first vibration sensor $V_{11}$ at a location close to the first seam segment $D_1$ on the first structural element $P_1$. Discrete signals of the vibration data collected by sensor $V_{11}$ are $a_{11}(k)$, $k=1, 2, 3, \ldots, N$, where k represents the sequence number of the discrete signals of the vibration data along a timeline, and the same k value means the same discrete time. Similarly, fix a second vibration sensor $V_{21}$ at a location close to the first seam segment $D_1$ on the second structural element $P_2$. Discrete signals of the vibration data collected by sensor $V_{21}$ are $a_{12}(k)$, $k=1, 2, 3, \ldots, N$.

When the welded fastening structure is in good condition, vibration modes at locations, which are close to the first seam segment $D_1$ but on the first and second structural elements $P_1$ and $P_2$ separately, are identical in vibration direction, vibration frequency, and vibration intensity. When the fastening structure is loosened or the welding seam has cracks, the two vibration modes at the two locations close to the first seam segment $D_1$ become different. If the fastening structure is loosened further or the seam cracks spread further, the difference between the two vibration modes becomes larger.

$a_{11}(k)$ and $a_{12}(k)$ are the discrete signals of vibration data collected respectively by vibration sensors $V_{11}$ and $V_{21}$ in a certain time period. The two vibration sensors may detect different intensity values of vibration coming from the same vibration source. If the intensity of the discrete signals detected by vibration sensor $V_{11}$ is used as the reference, the intensity discrepancy factor may be eliminated. The looseness index $S_1$ for measuring the looseness degree of the first welding seam segment $D_1$ is calculated by formula (1).

$$S_1 = \frac{\sum_{k=1}^{N}[a_{11}(k) - a_{12}(k)]^2}{\sum\limits_{k=1}^{N} a_{11}(k)^2} \quad (1)$$

Here $\Sigma_{k=1}^{N}[a_{11}(k)-a_{12}(k)]^2$ represents the square of the Euclidean distance of the sequence of the two vibration parameters in N dimensional space, reflecting the difference between data of the two vibration parameters. The N value is selected in consideration of the sampling frequency and the vibration frequency in applications. As the vibration frequency is usually hundreds of Hertz, the sampling frequency may be thousands of Hertz based on the Nyquist's sampling theorem. The sampling number of several vibration cycles may be chosen as the N value.

When calculating the looseness index, let the reference be the intensity of vibration data detected by one vibration acceleration sensor mounted on a structural element. Thus the intensity discrepancy factor caused by vibration may be eliminated. The looseness index of the fastening structure is calculated by formula (1). The looseness index may be used to measure the looseness degree of a fastening structure. The larger the looseness index, the higher the looseness degree, which means that the fastening structure is loosened further.

With the same method, vibration sensors $V_{12}$ and $V_{22}$, $V_{13}$ and $V_{23}$, $V_{1N}$ and $V_{2N}$ may be mounted close to corresponding welding seam segments respectively as shown in the figure. Looseness indexes of welding seam segments $D_2$, $D_3$, ..., $D_n$ are obtained via formula (2).

$$S_i = \frac{\sum_{k=1}^{N}[a_{i1}(k) - a_{i2}(k)]^2}{\sum\limits_{k=1}^{N} a_{i1}(k)^2} \quad (2)$$

The fastening state of each welding seam segment may be determined by predetermined looseness index thresholds respectively.

In the embodiment, the looseness index thresholds are obtained through experiments. Specifically, it includes the following steps: cutting the welding seam, creating vibration, collecting discrete signals such as $a_{11}(k)$ and $a_{12}(k)$, calculating the looseness index using formula (1), generating a relationship curve between the looseness index and looseness state of the welding seam, and finally determining a corresponding looseness index threshold according to the needed fastening degree of the welding seam in practice.

In the embodiment, the processing module is connected to the cloud. The vibration sensors are also connected to the cloud via communication networks. After the vibration data is transmitted to the processing module, a user may check the looseness index of a fastening structure to monitor its fastening state via a computer or a phone. The detection system may send out alarm signals by email, short message, etc.

Embodiment 2

Figure 2:
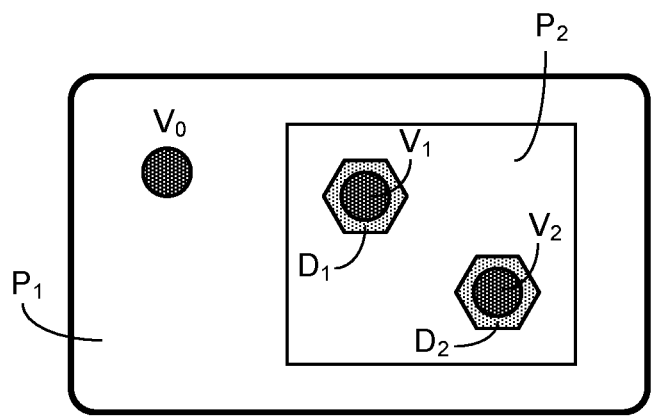
FIG. 2 shows an exemplary structure to illustrate another method and system for detecting the fastening state of a fastening structure which fixes multiple structural elements as described in embodiment 2.

Embodiment 2 illustrates a method and system for detecting a fastening structure which uses bolting to fix structural elements. In the embodiment, acceleration sensors are optionally employed as the vibration sensor. As shown in FIG. 2, a first structural element $P_1$ and a second structural element $P_2$ are connected and fastened by bolts $D_1$ and $D_2$ respectively.

In the embodiment, the looseness of bolt $D_1$ is monitored via vibration sensors $V_0$ and $V_1$. Sensor $V_0$ is mounted on the first structural element $P_1$, while sensor $V_1$ is mounted on bolt $D_1$.

Discrete signals of the vibration data collected by sensor $V_0$ are $a_0(k)$, $k=1, 2, 3, \ldots, N$. When bolt $D_1$ is tightened completely, vibration modes of the first structural element $P_1$ and bolt $D_1$ are identical in vibration direction, vibration frequency, and vibration intensity. When the bolt is loosened, the two vibration modes become different. If the bolt is loosened further, the difference between the two vibration modes becomes larger.

Looseness index $S_1$ of bolt $D_1$ is calculated using formula (3) based on discrete signals $a_0(k)$ and $a_1(k)$.

$$S_1 = \frac{\sum_{k=1}^{N}[a_0(k) - a_1(k)]^2}{\sum\limits_{k=1}^{N} a_0(k)^2} \quad (3)$$

Using the same method, looseness index $S_2$ of bolt $D_2$ is calculated using formula (4).

$$S_2 = \frac{\sum_{k=1}^{N}[a_0(k) - a_2(k)]^2}{\sum\limits_{k=1}^{N} a_0(k)^2} \quad (4)$$

The fastening state of $D_1$ and $D_2$ may be determined by predetermined looseness index thresholds.

In the embodiment, the looseness index thresholds are obtained through experiments. Specifically, it includes the following steps: loosening a bolt, creating vibration, collecting discrete signals $a_0(k)$ and $a_1(k)$, calculating the looseness index using formula (3), generating a relationship curve between the looseness index and looseness state of the bolt, and finally determining a corresponding looseness index threshold according to the needed tightening degree of the bolt in practice.

It is noted that vibration sensor $V_0$ is utilized as the baseline reference for vibration sensors $V_1$ and $V_2$. Sensor $V_2$ is mounted on bolt $D_2$.

Furthermore, since a loosened bolt is usually caused by vibration which makes the bolt to screw out, the screwed-out angle and/or the screwed-out turns of a bolt may be used as a criterion to determine looseness of the bolt.

Vibration sensors $V_0$ and $V_1$ in the embodiment have two or three axes.

In the present invention, the rotating plane of a fastening component is the plane perpendicular to the rotating axis of the fastening component. Assume that there are x-axis and y-axis in a rotating plane.

The vibration sensors are mounted when the bolts are tightened. During installation, vibration sensors $V_0$ and $V_1$ are arranged such that they collect vibration data along the x-axis and y-axis respectively. Vibration direction of the bolt in its rotating plane is calculated using the vibration data. Meanwhile, the installation orientation of vibration sensors $V_0$ and $V_1$ are arranged identical. Hence, vibration data collected by the two vibration sensors has the identical axial direction after installation. If it is uncertain that vibration data obtained from the two vibration sensors has the identical axial direction, calibration may be carried out via prearranged software to make them identical.

Vibration sensor $V_0$ is mounted on structural element $P_1$. Vibration direction of $P_1$ is calculated using vibration data collected along directions of the x-axis and the y-axis in a plane parallel to the rotating plane of bolt $D_1$. Vibration direction of $P_1$ is represented by angle $A_0$, which is the angle between the vibration direction of $P_1$ and the x-axis.

Vibration sensor $V_1$ is mounted on bolt $D_1$. Vibration direction of $D_1$ is calculated using vibration data collected along the x-axis and the y-axis in the rotating plane of the bolt. Vibration direction of $D_1$ is represented by angle $A_1$, which is the angle between the vibration direction of $D_1$ and the x-axis.

Vibration sensors $V_0$ and $V_1$ are mounted on structural element $P_1$ and bolt $D_1$ respectively. When structural element $P_1$ and bolt $D_1$ are fastened together completely, vibration directions of the two components are identical, that is, $A_1 = A_0$. When bolt $D_1$ is screwed out by a certain angle, vibration directions measured by vibration sensors $V_0$ and $V_1$ become different, that is, $A_1 \neq A_0$. The difference of angle $A_1 - A_0$ reflects the corresponding screwed-out angle of the bolt.

It is impossible to determine whether a bolt is screwed out by one turn, when relying solely on the vibration direction in a rotating plane. However, if the time interval between two inspections is short enough, a bolt may not be screwed by 360 degree or more during the time period. Thus, the accumulated screwed-out angle of a bolt may be obtained via uninterrupted and periodic detection records. For instance, if the accumulated screwed-out angle detected last time is 350 degree, the relative screwed-out angle is also 350 degree. If the relative screwed-out angle is 10 degree the following time, it means that the bolt is screwed out by 20 degree during a period between the two inspections. Thus, the accumulated screwed-out angle is 350+20=370 degree, or 1.028 turns, if calculated by screwed-out turns.

In the embodiment, the looseness index threshold may be represented by the screwed-out angle threshold. The screwed-out angle threshold is determined through experiments. Specifically, it may be arranged by loosening a bolt and determining the screwed-out angle threshold according to the screwed-out angle and the needed tightening degree of the bolt in practice.

In the embodiment, the processing module and vibration sensor $V_0$ may be integrated together and connected to the cloud via communication networks. A user may remotely check the screwed-out angle of a bolt to monitor its tightening state via a computer or a phone. The detection system may send out alarm signals by email, short message, etc.

In aforementioned detection systems, low-power, small-size, and low-cost vibration sensors are employed. Hence, the cost and power consumption of the systems is reduced.

The calculation method of the looseness index and screwed-out angle is simple and consumes less energy in a detection process compared to that of prior arts. In addition, values of looseness index and/or screwed-out angle enable fast and steady detection of the fastening state of a fastening structure. Moreover, multilevel looseness index thresholds and multilevel screwed-out angle thresholds may be set in accordance with specific experiments, and multilevel alarm signals about the fastening state of a fastening structure may be arranged through multiple ways. Therefore, comprehensive detection of the fastening state of a fastening structure may be conducted in time and at low cost.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method for detecting fastening state of a fastening structure which fixes a plurality of structural elements, comprising:
    collecting first vibration data of a first structural element using at least one first vibration sensor mounted on the first structural element;
    collecting second vibration data of a second structural element or the fastening structure using at least one second vibration sensor mounted on the second structural element or the fastening structure;
    calculating at least one value according to the first vibration data and second vibration data and using the second vibration data as reference in a corresponding calculation; and
    determining the fastening state of the fastening structure based on the at least one value,
    wherein the fastening structure includes a fastening component or a fixing structure formed by welding, absorbing, or bonding, the at least one value includes screwed-out angle or screwed-out turns, the first and second vibration sensors have two or more than two axes, the fastening component has threads, and determining the fastening state of the fastening structure further comprises setting at least one screwed-out angle threshold or one screwed-out turn threshold based on the screwed-out angle or screwed-out turns of the fastening component, and determining the fastening state of the fastening component by comparing the screwed-out angle or screwed-out turns with the screwed-out angle threshold or screwed-out turn threshold.

2. The method of claim 1, wherein the first and second vibration sensors include at least one of a vibration acceleration sensor, a vibration velocity sensor, and a vibration displacement sensor.

3. The method of claim 1, wherein the first and second vibration data includes at least one of data of vibration acceleration, data of vibration velocity, or data of vibration displacement.

4. The method of claim 1, wherein the at least one value further includes looseness index of the fastening structure, and determining the fastening state of the fastening structure further comprises setting at least one looseness index threshold of the fastening state, and determining the fastening state of the fastening structure by comparing the looseness index with the looseness index threshold.

5. The method of claim 4, wherein setting the at least one looseness index threshold of the fastening state comprises loosening the fastening structure to different fastening degree, obtaining relationship between the fastening state and the looseness index, and determining the looseness index threshold using the relationship.

6. A system for detecting fastening state of a fastening structure which fixes a plurality of structural elements, comprising:
   at least one first vibration sensor mounted on a first structural element for collecting first vibration data of the first structural element;
   at least one second vibration sensor mounted on a second structural element or the fastening structure for collecting second vibration data of the second structural element or the fastening structure; and
   a processing module for determining the fastening state of the fastening structure by calculating at least one value according to the first and second vibration data and using the second vibration data as reference in a corresponding calculation,
   wherein the fastening structure includes a fastening component or a fixing structure formed by welding, absorbing, or bonding, the fastening component has threads, the first and second vibration sensors have two or more than two axes, the at least one value includes screwed-out angle or screwed-out turns of the fastening component, at least one screwed-out angle threshold and/or one screwed-out turn threshold is set, and the fastening state of the fastening component is determined by comparing the screwed-out angle or screwed-out turns with the screwed-out angle threshold or the screwed-out turn threshold.

7. The system of claim 6, wherein the first and second vibration sensors include at least one of a vibration acceleration sensor, a vibration velocity sensor, and a vibration displacement sensor.

8. The system of claim 6, wherein the first and second vibration data includes at least one of data of vibration acceleration, data of vibration velocity, and data of vibration displacement.

9. The system of claim 6, wherein the at least one value further includes looseness index of the fastening structure, at least one looseness index threshold of the fastening state is set, and the fastening state of the fastening structure is determined by comparing the looseness index with the looseness index threshold.

10. The system of claim 9, wherein the at least one looseness index threshold of the fastening state is set by loosening the fastening structure to different fastening degree, calculating the looseness index of the fastening structure, obtaining relationship between the fastening state and the looseness index, and determining the looseness index threshold using the relationship.

11. The system of claim 6, wherein the system is an offline detection system.

12. The system of claim 6, wherein the system is an online detection system, the first and second vibration sensors respectively collect the first and second vibration data continuously or at scheduled times.

13. The system of claim 6, wherein the processing module sends out alarm signals based on the fastening state of the fastening structure.

* * * * *